US008682078B2

(12) United States Patent
Takagi (10) Patent No.: US 8,682,078 B2
(45) Date of Patent: Mar. 25, 2014

(54) MOVING IMAGE PROCESSING APPARATUS, MOVING IMAGE PROCESSING METHOD, AND PROGRAM

(75) Inventor: Yoshinori Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 191 days.

(21) Appl. No.: 13/196,585

(22) Filed: Aug. 2, 2011

(65) Prior Publication Data

US 2012/0039538 A1 Feb. 16, 2012

(30) Foreign Application Priority Data

Aug. 10, 2010 (JP) ................. P2010-179696

(51) Int. Cl.
*G06K 9/46* (2006.01)

(52) U.S. Cl.
USPC ............ 382/190; 382/218; 348/700

(58) Field of Classification Search
USPC .................. 382/190, 218; 348/700
See application file for complete search history.

(56) References Cited

U.S. PATENT DOCUMENTS

| 6,724,933 | B1 * | 4/2004 | Lin et al. ............... 382/164 |
| 2006/0164702 | A1 * | 7/2006 | Shiiyama ............... 358/537 |
| 2007/0112558 | A1 | 5/2007 | Kobayashi | |
| 2008/0166027 | A1 * | 7/2008 | Jeong et al. ............ 382/118 |
| 2010/0094782 | A1 | 4/2010 | Kobayashi | |

FOREIGN PATENT DOCUMENTS

| JP | 2007 121457 | 5/2007 |
| JP | 2008 123011 | 5/2008 |

OTHER PUBLICATIONS

Kwon et al. "A New Approach for High Level Video Structuring." 2000 IEEE International Conference on Multimedia and Expo, vol. 2, 2000, pp. 773-776.*
Chasanis et al. "Scene Detection in Videos Using Shot Clustering and Sequence Alignment." IEEE Transactions on Multimedia, vol. 11, No. 1, Jan. 2009, pp. 89-100.*
Rui et al. "Constructing table-of-content for videos." Multimedia Systems, 7, 1999, pp. 359-368.*

* cited by examiner

*Primary Examiner* — Jon Chang
(74) *Attorney, Agent, or Firm* — Sony Corporation (57) ABSTRACT

There is provided a moving image processing apparatus, including a similarity determination unit configured to determine a degree of similarity between a subsequent cut and first and second cut groups based on feature amounts generated from extraction images of the first cut group included in a moving image and feature amounts generated from extraction images of the second cut group included in the moving image, a cut grouping unit configured to group the subsequent cut into a similar cut group similar to the subsequent cut, which is one of the first and second cut groups, when the subsequent cut is similar to the first or second cut group, and group the subsequent cut into a third cut group when the subsequent cut is not similar to either of the first and second cut groups, a feature amount generation unit configured to compare extraction images extracted from the third cut group with the extraction images extracted from the first and second cut groups when the subsequent cut is not similar to either of the first and second cut groups, and generate feature amounts of the third cut group, and an image extraction unit configured to preferentially extract an image with a later time code of the moving image from images included in each cut group, thereby obtaining extraction images of each cut group.

20 Claims, 11 Drawing Sheets

| FEATURE AMOUNT / CUT | (trees/person) | (person) | (flowers) |
|---|---|---|---|
| (trees/person) | GENERATE FEATURE AMOUNT S1 | — | — |
| (person) | — | GENERATE FEATURE AMOUNT S2 | — |
| (trees/person) | 0.9 | 0.2 | — |
| (person) | 0.3 | 0.8 | — |
| (flowers) | 0.1 | 0.2 | GENERATE FEATURE AMOUNT S3 |
| (trees/person) | 0.8 | 0.3 | 0.2 |
| (person) | 0.1 | 0.9 | 0.1 |

| CUT ID | GROUP ID |
|---|---|
| 1 | 1 |
| 2 | 2 |
| 3 | 1 |
| 4 | 2 |
| 5 | 3 |
| 6 | 1 |
| 7 | 2 |

FIG.10

MOVING IMAGE PROCESSING APPARATUS, MOVING IMAGE PROCESSING METHOD, AND PROGRAM

BACKGROUND

The present disclosure relates to a moving image processing apparatus, a moving image processing method, and a program.

In general, a video (or a moving image) includes a plurality of cuts. In video expression, there is a case in which a cut structure is devised such as an arrangement of cuts with the same content at temporal intervals according to the intention of a maker.

SUMMARY

Further, there is a case in which it is necessary to understand a cut structure of a video in order to view or use the video. In such a case, the cut structure of the video is understood by dividing the video into a plurality of cuts and grouping similar cuts into a common cut group. However, when the cuts are not appropriately grouped, it may not be possible to appropriately understand the cut structure.

In light of the foregoing, it is desirable to provide a moving image processing apparatus, a moving image processing method, and a program, which can appropriately group cuts of a video.

According to an embodiment of the present disclosure, there is provided a moving image processing apparatus, including a similarity determination unit configured to determine a degree of similarity between a subsequent cut and first and second cut groups based on feature amounts generated from extraction images of the first cut group included in a moving image and feature amounts generated from extraction images of the second cut group included in the moving image, a cut grouping unit configured to group the subsequent cut into a similar cut group similar to the subsequent cut, which is one of the first and second cut groups, when the subsequent cut is similar to the first or second cut group, and group the subsequent cut into a third cut group when the subsequent cut is not similar to either of the first and second cut groups, a feature amount generation unit configured to compare extraction images extracted from the third cut group with the extraction images extracted from the first and second cut groups when the subsequent cut is not similar to either of the first and second cut groups, and generate feature amounts of the third cut group, and an image extraction unit configured to preferentially extract an image with a later time code of the moving image from images included in each cut group, thereby obtaining extraction images of each cut group.

When the subsequent cut is similar to the first or second cut group, the feature amount generation unit may compare extraction images extracted from the similar cut group including the subsequent cut with extraction images extracted from a cut group not similar to the subsequent cut, and may generate feature amounts of the similar cut group.

When the subsequent cut is similar to the first or second cut group, the image extraction unit may extract the extraction images from the subsequent cut and the cut group similar to the subsequent cut.

When the subsequent cut is similar to the first or second cut group, the image extraction unit may extract the extraction images from the subsequent cut.

The feature amount generation unit may compare extraction images extracted from the first cut group with extraction images extracted from the second cut group, and may generate feature, amounts of the first cut group and feature amounts of the second cut group.

The image extraction unit may extract images positioned at a regular interval in order from the latest time code from the images included in each cut group.

The image extraction, unit may extract images positioned at an interval expressed by geometric progression in order from the latest time code from the images included in each cut group.

The image extraction unit may extract images positioned at an interval expressed by progression of differences in order from the latest time code from the images included in each cut group.

According to another embodiment of the present disclosure, there is provided a moving image processing method, including, determining a degree of similarity between a subsequent cut and first and second cut groups based on feature amounts generated from extraction images of the first cut group included in a moving image and feature amounts generated from extraction images of the second cut group included in the moving image, when the subsequent cut is similar to the first or second cut group, grouping the subsequent cut into a similar cut group similar to the subsequent cut, which is one of the first and second cut groups, and when the subsequent cut is not similar to either of the first and second cut groups, grouping the subsequent cut into a third cut group, and comparing extraction images extracted froth the third cut group with extraction images extracted from the first and second cut groups to generate feature amounts of the third cut group. Extraction images of each cut group are obtained by preferentially extracting an image with a later time code of the moving image from images included in each cut group.

According to yet another embodiment of the present disclosure, there is provided a program causing a computer to execute the moving image processing method. The program may be provided in a computer-readable medium or via means of communication and the like.

According to the embodiment of the present disclosure described above, it is possible to provide a moving image processing apparatus, a moving image processing method, and a program, which can appropriately group cuts of a video.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

1. OVERVIEW OF MOVING IMAGE PROCESSING METHOD

Figure 1:
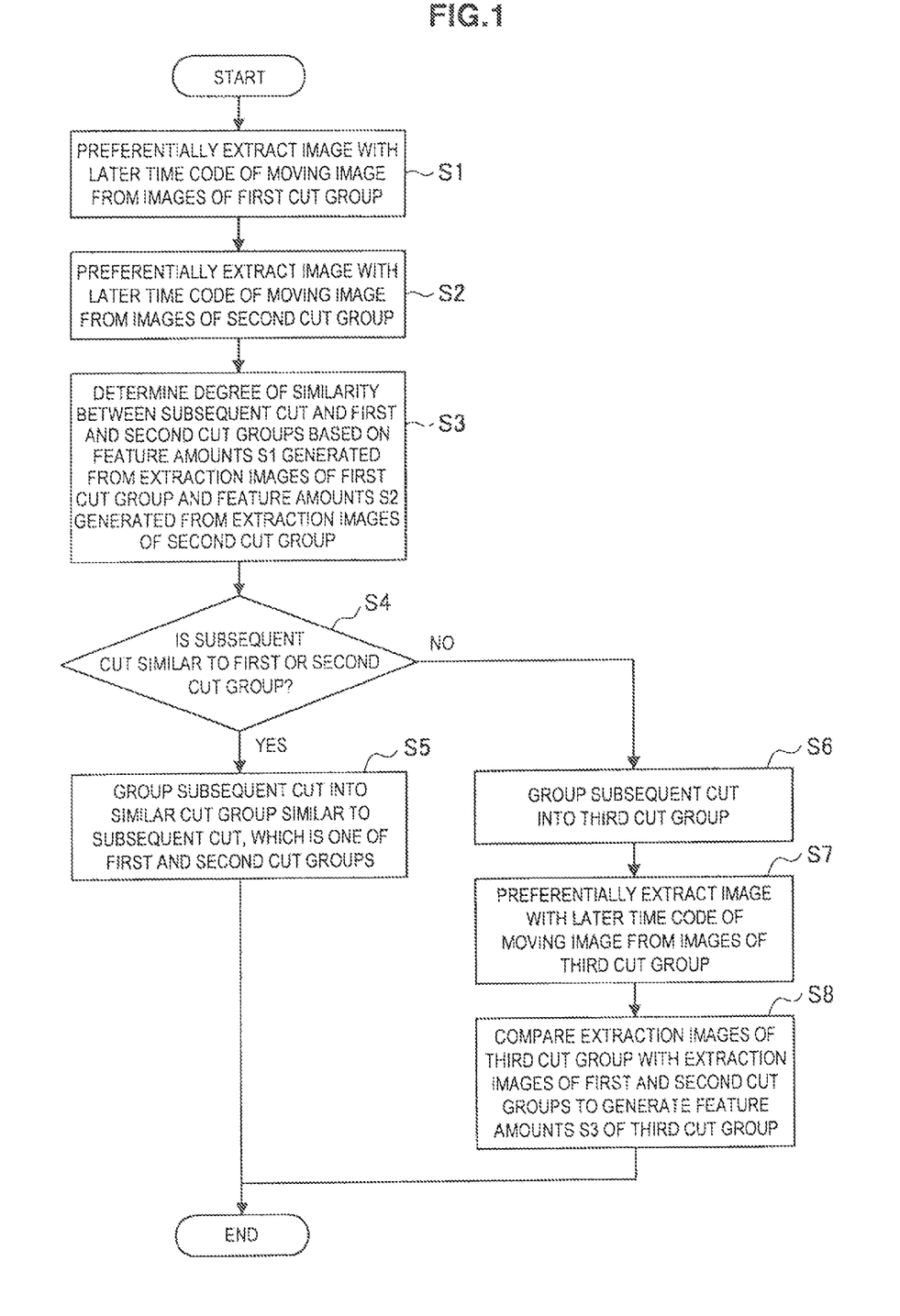
FIG. 1 is a diagram illustrating the overview of a moving image processing method according to an embodiment of the present disclosure.

First, the overview of the moving image processing method according to an embodiment of the present disclosure will be described with reference to FIG. 1. FIG. 1 illustrates the overview of the moving image processing method according to the embodiment of the present disclosure.

As illustrated in FIG. 1, in the moving image processing method, among images of a first cut group included in the moving image MP, images with a later time code of the moving image MP are preferentially extracted (step S1). In the same manner, among images of a second cut group included in the moving image MP, images with a later time code of the moving image MP are preferentially extracted (step S2). Next, the degree of similarity between subsequent cuts and the first and second cut groups is determined based on feature amounts S1 generated from extraction images of the first cut group and feature amounts S2 generated from extraction images of the second cut group (step S3).

Then, it is determined whether the subsequent cuts are similar to the first or second cut group (step S4). When the subsequent cuts are similar to the first or second cut group ("Yes" in step S4), the subsequent cuts are grouped into a similar cut group (e.g., the first cut group) similar to the subsequent cut, which is one of the first and second cut groups (step S5).

Meanwhile, when the subsequent cuts are not similar to either of the first and second cut groups ("No" in step S4), the subsequent cuts are grouped into a third cut group (step S6). In addition, among images of the third cut group including the subsequent cut, images with a later time code of the moving image MP are preferentially extracted (step S7). Then, extraction images of the third cut group are compared with the extraction images of the first and second cut groups, and feature amounts S3 of the third cut group are generated (step S8).

Here, in relation to the extraction images of each cut group, images with a later time code of the moving image MP are preferentially extracted from among the images included in each cut group. Furthermore, feature amounts S (the general term for feature amounts of cut groups) of each cut group are generated by emphasizing feature amounts of images near the subsequent cuts, which are to be subject to determination of similarity, among the images included in each cut group based on the time codes of the moving image MP. Consequently, it is possible to appropriately group the subsequent cuts by sufficiently considering the temporal context (a story and the like of the moving image MP) between cuts.

2. CONFIGURATION OF MOVING IMAGE PROCESSING APPARATUS 1

Figure 2:
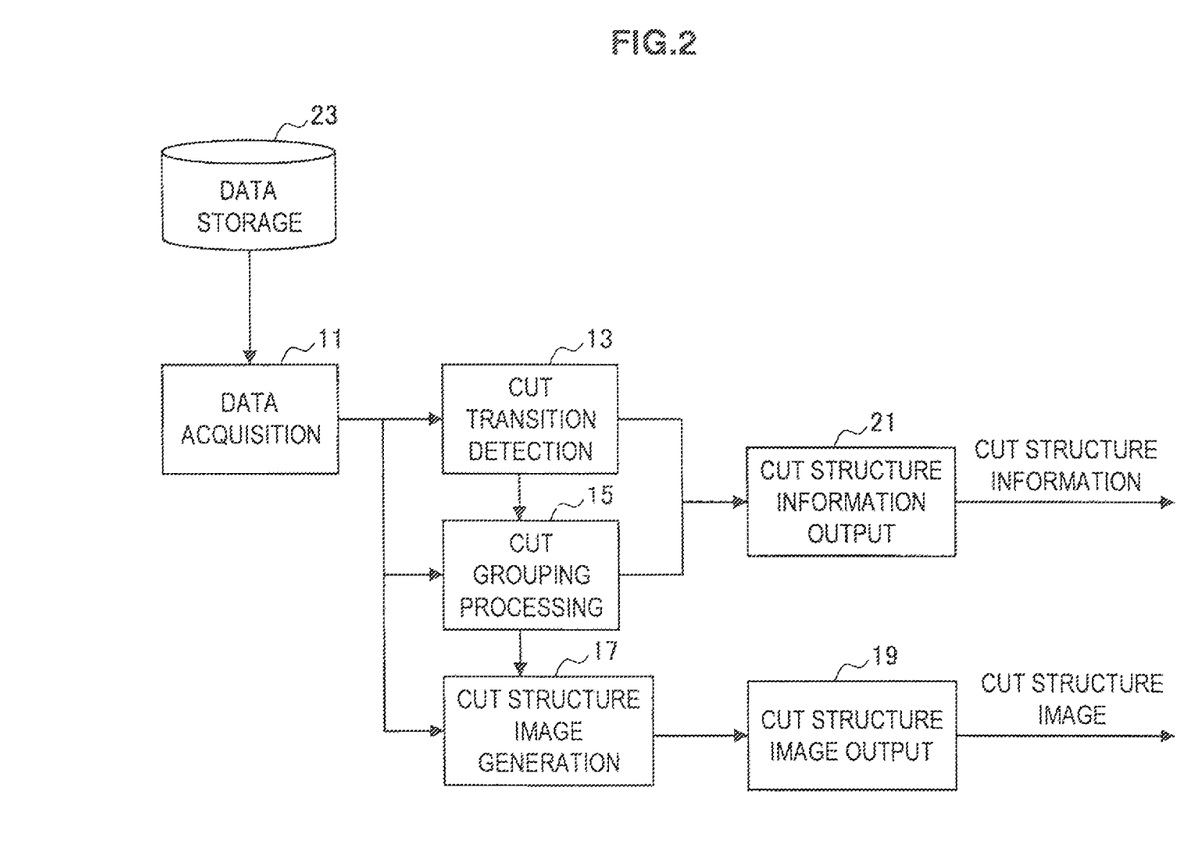
FIG. 2 is a block diagram illustrating the configuration of a moving image processing apparatus according to an embodiment of the present disclosure.

Next, the moving image processing apparatus 1 according to the embodiment of the present disclosure will be described with reference to FIG. 2. FIG. 2 illustrates the main functional configuration of the moving image processing apparatus 1. As illustrated in FIG. 2, the moving image processing apparatus 1 includes a data acquisition unit 11, a cut transition detection unit 13, a cut grouping processing unit 15, a cut structure image generation unit 17, a cut structure image output unit 19, a cut structure information output unit 21, and a data storage unit 23.

The data acquisition unit 11 acquires moving image data MP including a plurality of cuts, and supplies the moving image data MP to the cut transition detection unit 13, the cut grouping processing unit 15, and the cut structure image generation unit 17. In general, the moving image data MP is data in a frame format, and may be only image data or a combination of image data and voice data. The moving image data MP may be acquired from the data storage unit 23 or an external apparatus (not shown).

The cut transition detection unit 13 detects cut transition in the moving image data MP, and supplies a detection result to the cut grouping processing unit 15. The cut transition represents a change in cuts in the moving image MP. The feature amounts of images and/or voice in frames in succession is obtained and the cut transition is detected based on the degree of similarity of the feature amounts. As the feature amounts of the images and/or the voice, a color histogram and facial image detection, and/or the volume, tone/rhythm and the like of voice can be used. In addition, the detection result of the cut transition may be supplied to the cut structure information output unit 21, the data storage unit 23, an external apparatus and the like, in addition to the cut grouping processing unit 15. Furthermore, feature amounts obtained when detecting the cut transition may be stored in the data storage unit 23 and the like and used for other processes.

The cut grouping processing unit 15 groups the plurality of cuts into cut groups based on the degree of inter-cut similarity, which will be described, in detail later. The cut grouping result is supplied to the cut structure image generation unit 17 together with the detection result of the cut transition. However, the cut grouping result may be supplied to the cut structure information output unit 21, the data storage unit 23, the external apparatus and the like. The cut grouping processing unit 15 assigns group IDs representing cut groups to the cuts based on the cut grouping result. The cut grouping processing unit 15 serves as an image extraction unit, a similarity determination unit, a cut grouping unit, and a feature amount generation unit The degree of inter-cut similarity is generated from a color histogram of images and/or voice included in the cuts and a detection result of a facial image, and/or feature amounts of cuts including the volume, tone/rhythm and the like of the voice. The cut group represents a combination of cuts with similar feature amounts.

In order to generate a cut structure image CI, the cut structure image generation unit 17 extracts a representative image I (the general term for representative images) from images included in each cut based on the detection result of the cut transition according to predetermined standards. The representative image I is an image representing each cut, and for example, is extracted as an image corresponding to the center frame of the cut. Then, the cut structure image generation unit 17 generates the cut structure image CI indicating the cut structure of the moving image MP based on the moving image data MP and the cut grouping result. For example, the cut structure image CI is an image including a representative image I of each cut arranged in the order of the cut transition and indicating the cut groups.

The cut structure image output unit 19 outputs the cut structure image CI supplied from the cut structure image generation unit 17 such that a user can easily understand the cut structure of the moving image MP. The cut structure image CI may be output to a display apparatus, a printing apparatus, a storage apparatus, or an external apparatus (not shown) connected to the moving image processing apparatus 1.

The cut structure information output unit 21 outputs the cut grouping result and the like as cut structure information such that a user can use the cut structure information to understand the cut structure. The cut structure information may be output to the display apparatus, the printing apparatus, the storage apparatus, or the external apparatus (not shown) connected to the moving image processing apparatus 1. The cut structure information can be used as data for performing a moving image search considering the cut structure.

The data storage unit 23 stores the moving image data MP and data belonging to the moving image data MP. The data storage unit 23 may store the cut structure information, such as the detection result of the cut transition and the cut grouping result, and the cut structure image CI, which are associated with the moving image data MP. Furthermore, in FIG. 2, a part of a connection relationship between the data storage unit 23 and other elements is omitted.

Here, in the functional configuration, the data acquisition unit 11, the cut transition detection unit 13, the cut grouping processing unit 15, the cut, structure image generation unit 17, the cut structure image output unit 19, and the cut structure information output unit 21 include an arithmetic processing unit such as a CPU or a digital signal processing apparatus (DSP). The data storage unit 23 includes an internal storage device such as a flash memory, or an external storage device such as a hard disk drive or a Blu-ray disc drive. The CPU develops and executes a program read from a ROM and the like on a RAM, thereby performing the moving image processing method. In addition, at least a part of the functional configuration may be realized by hardware such as a dedicated logic.

3. OPERATION OF MOVING IMAGE PROCESSING APPARATUS 1

Figure 3:
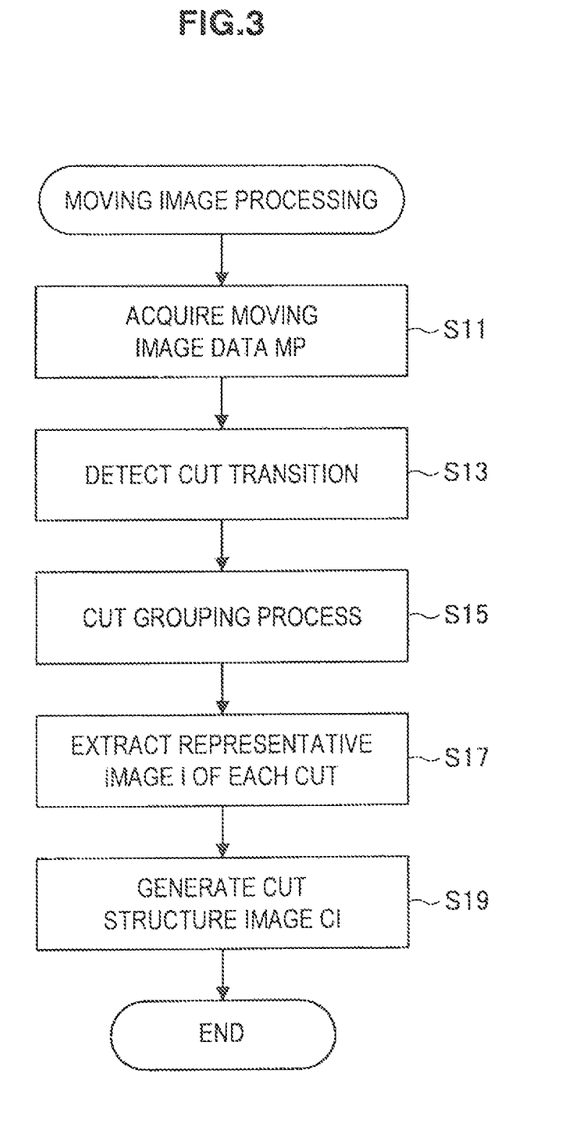
FIG. 3 is a flowchart illustrating the operation procedure of a moving image processing apparatus.

Next, the operation of the moving image processing apparatus 1 according to the embodiment of the present disclosure will be described with reference to FIGS. 3 to 11. FIG. 3 illustrates the operation procedure of the moving image processing apparatus 1.

As illustrated in FIG. 3, the data acquisition unit 11 firsts acquires moving image data MP (step S11) and supplies the moving image data MP to the cut transition detection unit 13 and the like. The cut transition detection unit 13 detects cut transition in a moving image MP based on the moving image data MP (step S13), and supplies the detection result to the cut grouping processing unit 15 and the like. The cut transition is detected based on the feature amounts of images and/or voice in frames in succession.

Figure 4:
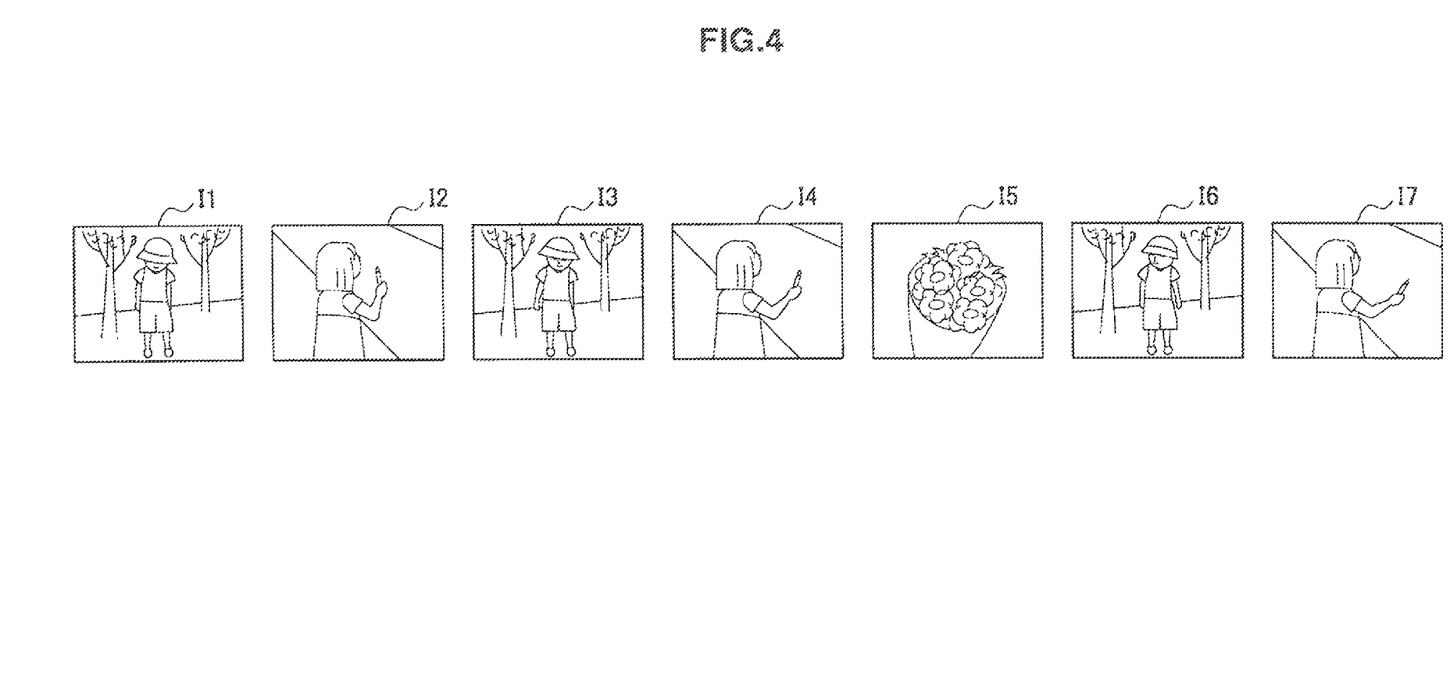
FIG. 4 is a diagram illustrating an example of a cut structure obtained from the detection result of cut transition.

FIG. 4 illustrates an example of a cut structure obtained from the detection result of the cut transition. In order to facilitate understanding, FIG. 4 illustrates a cut structure using representative images 11 to 17 of respective cuts. In addition, the representative images I are extracted by the cut structure image generation unit 17 from the moving image data MP as will be described later. As illustrated in FIG. 4, cuts 1, 3 and 6 are similar to one another, cuts 2, 4 and 7 are similar to one another, and a cut 5 is not similar to any of the cuts 1 to 4, 6 and 7.

Figure 5:
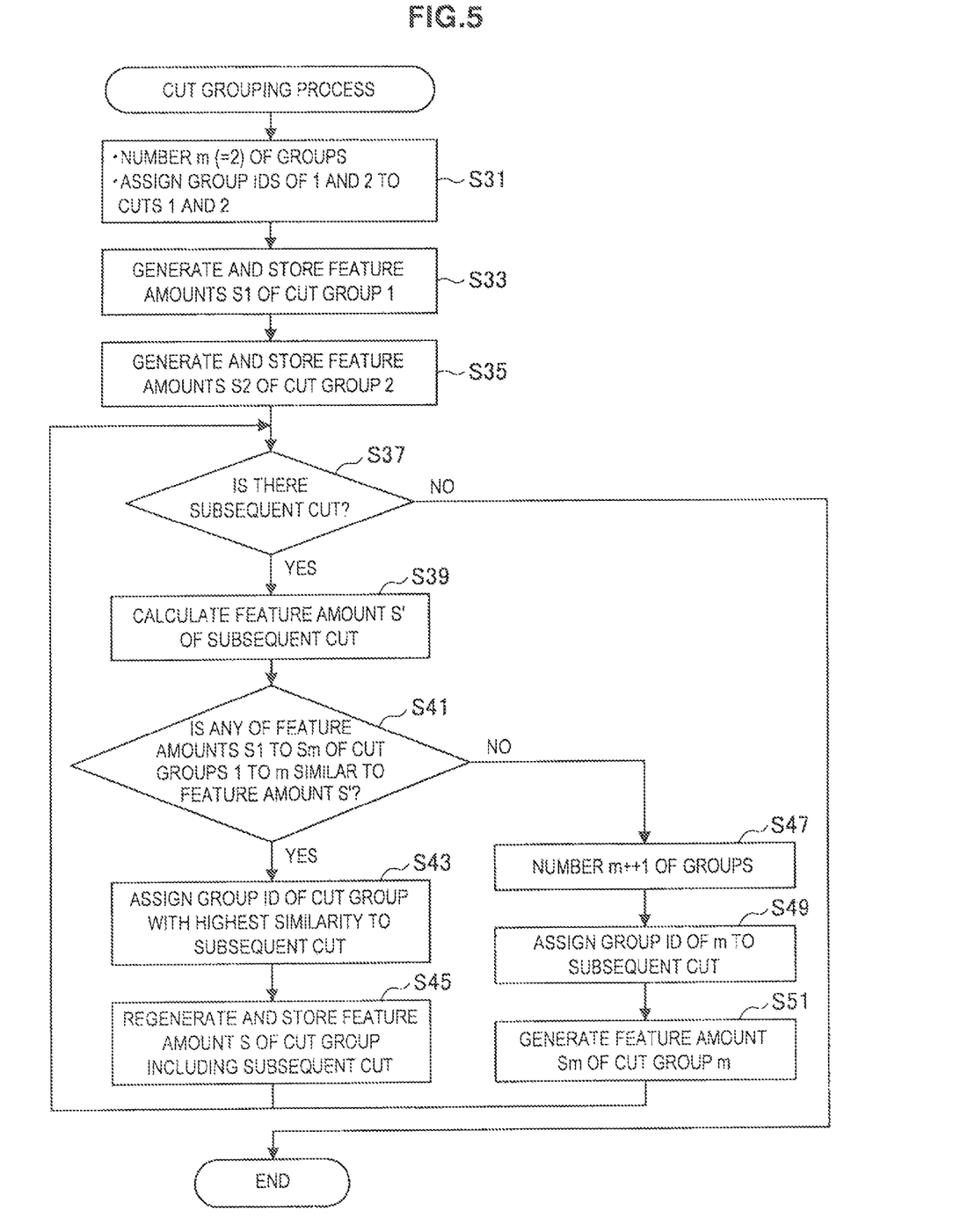
FIG. 5 is a flowchart illustrating the procedure of a cut grouping process.

Returning to the description of FIG. 3, next, the cut grouping processing unit 15 performs a cut grouping process of grouping the cuts into cut groups (step S15). FIG. 5 illustrates the procedure of the cut grouping process. As illustrated in FIG. 5, in the cut grouping process, an initialization process is first performed (step S31). In the initialization process, the number m of groups is initialized. Furthermore, a group ID of 1 is assigned to the cut 1 and a group ID of 2 is assigned to the cut 2. Here, the number m of the groups indicates the number (cut groups 1 and 2 are specified in the initialization process) of the cut groups specified from the moving image data MP. The group ID is assigned to each cut in order to indicate a cut group to which each cut belongs.

Figure 6:
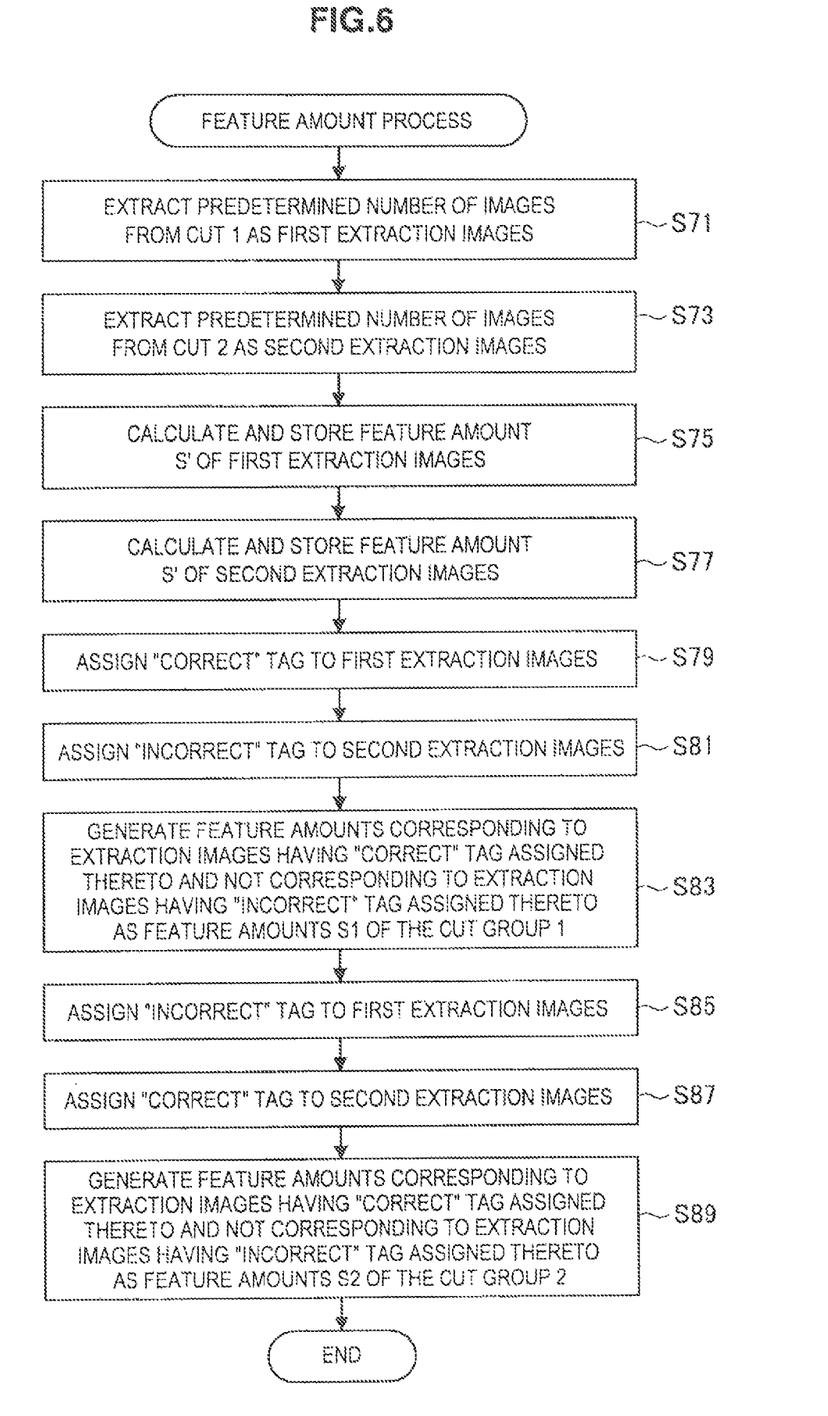
FIG. 6 is a flowchart illustrating the procedure of a feature amount generation process.

Then, feature amounts of the cut 1 are generated and stored in the data storage unit 23 and the like as the feature amounts S1 of the cut group 1 (step S33). In the same manner, feature amounts of the cut 2 are generated and stored in the data storage unit 23 and the like as the feature amounts S2 of the cut group 2 (step S35). FIG. 6 illustrates the procedure of a feature amount generation process.

As illustrated in FIG. 6, a predetermined number of images are first extracted from images of the cut 1 as first extraction images, and a predetermined number of images are extracted from images of the cut 2 as second extraction images (steps S71 and S73). Usually, each cut includes images of several tens to several thousands of frames, and for example, images of about 10 frames are extracted as the first and second extraction images, respectively. The first and second extraction images, for example, are extracted according to the following extraction rules.

Figure 7:
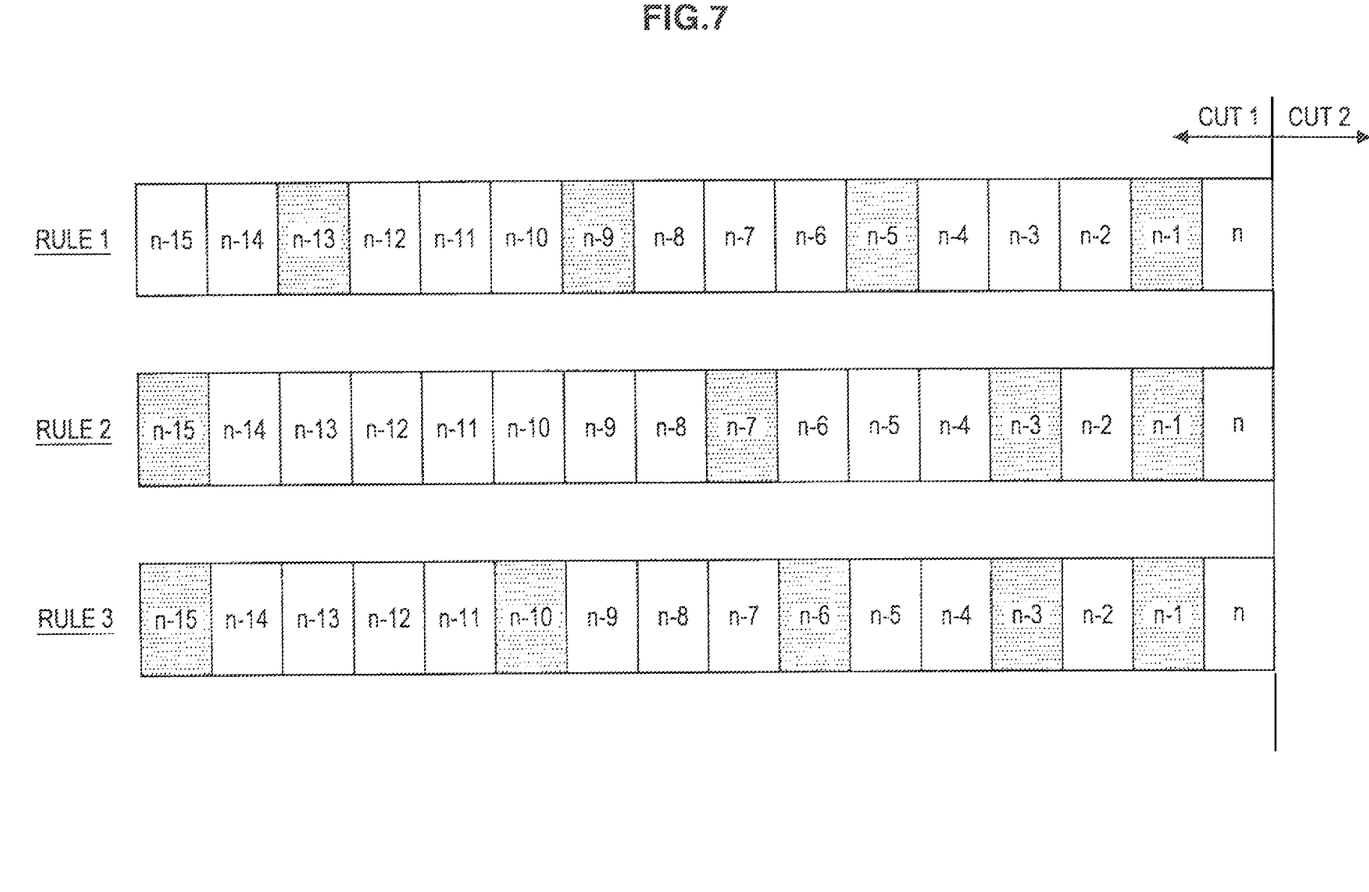
FIG. 7 is a diagram illustrating an example of extraction rules of images.

FIG. 7 illustrates the extraction rules of images. FIG. 7 illustrates the case in which the cut grouping process is performed in the order of the time codes of the moving image data MP, that is, according to the reproduction direction of the moving image data MP. The time code is time information assigned to each frame (image) of the moving image MP, and is assigned by employing a start frame as the starting point.

In FIG. 7, among the images of the cut 1, the first extraction images are preferentially extracted at the cut transition time point from the cut 1 to the cut 2, that is, from images near the final frame n of the cut 1. In addition, in FIG. 7, extracted images (frames) are hatched by dots.

According to the rule 1 of FIG. 7, when setting the final frame of the cut 1 as a frame n, a predetermined number of images (e.g. frames n−1, n−5, n−9, n−13, n−17, . . . ) are extracted at a regular interval (arithmetic progression with a common difference of 4) of four frames. According to the rule 2 of FIG. 7, in the same manner, a predetermined number of images (e.g. frames n−1, n−3, n−7, n−15, n−31, . . . ) are extracted at an interval (geometric progression with a common ratio of 2) of two frames, four frames, eight frames, 16 frames, . . . . According to the rule 3 of FIG. 7, in the same manner, a predetermined number of images (e.g. frames n−1, n−3, n−6, n−10, n−15, . . . ) are extracted at an interval (progression of differences with a common difference of 1) of two frames, three frames, four frames, five frames, . . . .

In addition, in any one of the rules 1 to 3, the common difference and the common ratio are set as arbitrary values, respectively. In the same manner, the extraction images may be extracted including the final frame or extracted by excluding several frames around the final frame. Furthermore, although not shown in FIG. 7, a predetermined number of frames with a large pixel difference relative to an adjacent frame may be extracted. Moreover, the extraction images, for example, may be extracted at an interval by arithmetic progression or geometric progression by combining the rule 1 with the rule 2.

In the processes of steps 71 and 73, in relation to the first extraction images, images near the final frame of the cut 1 are preferentially extracted from the images of the cut 1 according to the extraction rules. In relation to the second extraction images, images near the final frame of the cut 2 are preferentially extracted from the images of the cut 2.

Next, various feature amounts of the images extracted as the first and second extraction images are calculated. Various feature amounts, for example, are calculated as a color histogram and facial image detection, and/or the volume, tone/rhythm and the like of voice, or a combination thereof. The calculated feature amounts of the images are stored in the data storage unit 23 and the like in order to be used for the processes which will be described later (steps S75 and 77).

Then, a "correct" tag is assigned to the first extraction images and an "incorrect" tag is assigned to the second extraction images (steps S79 and 81). Here, the "correct" tag is assigned to the first extraction images extracted from the cut 1 because it is highly probable that the first extraction images include the feature amounts S1 of the cut group 1 as compared with the second extraction images, and the "incorrect" tag is assigned to the second extraction images because it is less probable that the second extraction images include the feature amounts S1 of the cut group 1 as compared with the first extraction images.

Then, feature amounts corresponding to the first extraction, images having the "correct" tag assigned thereto and not corresponding to the second extraction images having the "incorrect" tag assigned thereto are generated as the feature amounts S1 of the cut group 1 (step S83). That is, the feature amounts S1 of the cut group 1 are generated as feature amounts for distinguishing the first extraction images from the second extraction images.

For example, it is assumed that arbitrary feature amounts A have a predetermined quantitative or qualitative value in the first extraction images, but do not have the predetermined quantitative or qualitative value in the second extraction images. In this case, feature amounts (features) S1, in which the feature amounts A have the predetermined quantitative or qualitative value, are generated. Of course, for a combination of arbitrary feature amounts A, B, . . . , feature amounts (features) are generated in the same manner.

Next, a "correct" tag is assigned to the second extraction images and an "incorrect" tag is assigned to the first extraction images (steps S85 and 87). Then, feature amounts corresponding to the second extraction images having the "correct" tag assigned thereto and not corresponding to the first extraction images having the "incorrect" tag assigned thereto are generated as the feature amounts S2 of the cut group 2 (step S89). That is, the feature amounts S2 of the cut group 2 are generated as feature amounts for distinguishing the second extraction images from the first extraction images.

Returning to the description of FIG. 5, the presence or absence of a subsequent cut to be processed is checked (step S37). The subsequent cut is checked in the order of the cut 3, the cut 4, whenever performing the process of step S37. When the subsequent cut is present ("Yes" in step S37), the feature amounts S' of the subsequent cut are generated (step S39), and, the similarity of the feature amounts is determined between the subsequent cut and cut groups 1 to m (step S41).

In the determination of similarity, a predetermined number of images are first extracted from images of the subsequent cut as comparison images. The comparison images are extracted as a predetermined number of images representing the images of the subsequent cut. The comparison images may be extracted according to the extraction rules illustrated in FIG. 7 or other extraction rules.

Next, it is determined whether feature amount are similar between the comparison images and the images of the cut groups 1 to m, that is, whether the subsequent cut is similar to the cut groups 1 to m.

Here, the feature amounts S1 to Sm of the cut groups 1 to m are generated by emphasizing feature amounts of images near the subsequent cuts, which are to be subject to the determination of similarity, among the images of each cut group based on the time codes of the moving image MP. For example, the feature amounts S1 of the cut group 1 are generated by emphasizing the feature amounts of the images near the final frame of the cut 1 among the images of the cut 1. Therefore, the similarity of feature amounts is determined between the comparison images and images near the subsequent cut among the images of the cut groups 1 to m based on the time codes of the moving image MP.

In addition, in the determination of similarity, the degree of similarity of the feature amounts may be preferentially determined between the subsequent cut and a cut group with a group ID larger than that of an immediately previous cut. This is because the group ID of a cut group including the subsequent cut is larger than that of the immediately previous cut when the cuts are repeated.

When the degree of similarity of the feature amounts is equal to or more than a predetermined threshold value between the subsequent cut and any one of the cut groups 1 to m ("Yes" in step S41), the group ID of a cut group with the highest similarity is assigned to the subsequent cut (step S43).

For example, when the degree of similarity between the subsequent cut and the cut group 1 satisfies the predetermined threshold value, the subsequent cut is grouped into the cut group 1. In such a case, the feature amounts S1 of the cut group 1 are regenerated and stored according to the following procedure (step S45).

Figure 8:
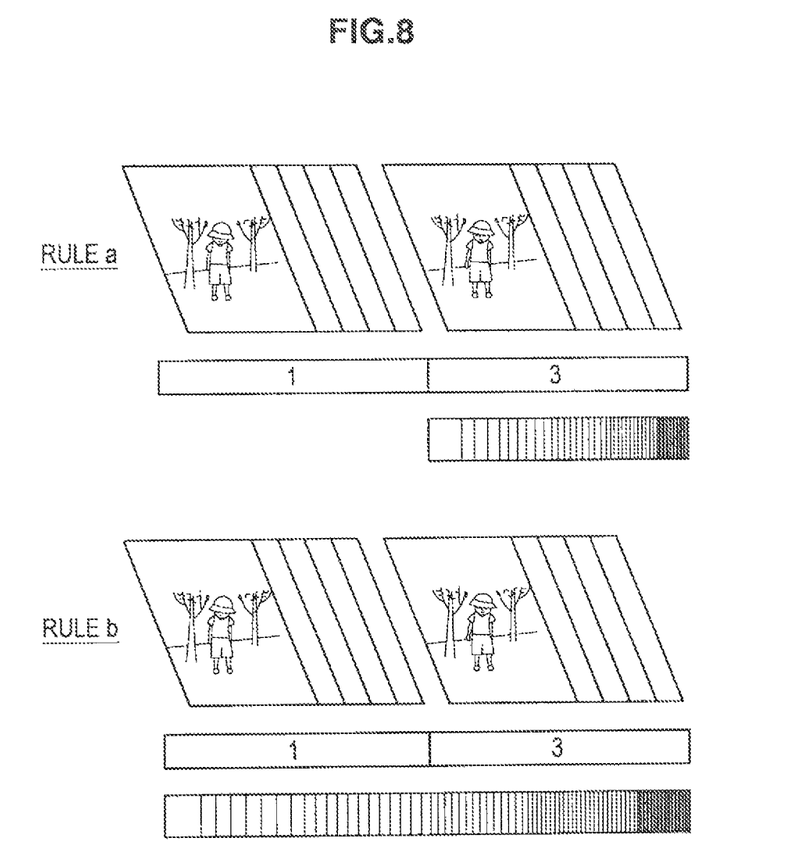
FIG. 8 is a diagram illustrating an example of regeneration rules of feature amounts.

First, a predetermined number of images are extracted from the images included in the cut group 1 including the subsequent cut as first extraction images. The first extraction images are also extracted according to the extraction rules illustrated in FIG. 7. FIG. 8 illustrates rules of a feature amount regeneration process. FIG. 8 illustrates a cut structure including a cut 1, a cut 2, and a cut 3 similar to the cut 1. In addition, in FIG. 8, the positions of images preferentially extracted as the extraction images of a cut group are densely hatched.

According to the rule a of FIG. 8, among images included in the cut 3 grouped into the cut group 1, images near the final frame of the cut 3 are preferentially extracted as first extraction images. In such a case, images included in the cut 1 are not extracted. Meanwhile, according to the rule b of FIG. 8, among images included in the cut 1 and the cut 3 grouped into the cut group 1, images near the final frame of the cut 3 are preferentially extracted as the first extraction images. In such a case, the images included in the cut 1 are also extracted.

In addition, the number of the first extraction images may be equal to or more than the number of extraction images at the time of the initial generation of feature amounts. Furthermore, the first extraction images may be extracted under the same conditions as those of the extraction images at the time of the process of step S33, or under different conditions. For example, at the time of the initial generation of feature amounts, different common differences and common ratios may be used, or different may be used (e.g., the rule 1 is used when feature amounts are initially generated, the rule 2 is used when the feature amounts are regenerated, and the like).

Furthermore, the first extraction images may be extracted by combining a plurality of different conditions with one another. For example, the rule a may be combined with the rule 1 and the rule b may be combined with the rule 2. In such a case, while images are extracted at an interval by arithmetic progression and at an interval expressed by geometric progression from the subsequent cut, images are extracted at an interval expressed by progression of differences from cuts other than the subsequent cut.

Next, various feature amounts of the images extracted as the first extraction images of the cut group 1 are calculated. In addition, as the feature amounts of second to $m^{th}$ extraction images of the cut groups 2 to m, feature amounts generated at the time of the generation of each cut group are used.

Then, a "correct" tag is assigned to the first extraction images and an "incorrect" tag is assigned to the second to $m^{th}$ extraction images. Here, the "correct" tag is assigned to the first extraction images because it is highly probable that the first extraction images extracted from the cut group 1 include the feature amounts of the cut group 1 as compared with the second to $m^{th}$ extraction images, and the "incorrect" tag is assigned to the second to $m^{th}$ extraction images because it is less probable that the second to $m^{th}$ extraction images include the feature amounts of the cut group 1 as compared with the first extraction images.

Then, feature amounts corresponding to the first extraction images having the "correct" tag assigned thereto and not corresponding to the second to mth extraction images having the "incorrect" tag assigned thereto are generated as the feature amounts S1 of the cut group 1. That is, the feature amounts S1 of the cut group 1 are generated as feature amounts for distinguishing the first extraction images from the second to $m^{th}$ extraction images. In this way, the feature amounts S1 of the cut group 1 are generated as the feature amounts of the first extraction images obtained by preferentially extracting the images near the final frame of the subsequent cut from the images of the cut group 1.

In the same manner, when the degree of similarity between the comparison images and a cut group x (1<x<m) satisfies a predetermined threshold value, the subsequent cut is grouped into the cut group x. In such a case, in the same manner as the cut group 1, feature amounts Sx of the cut group x are regenerated. In this way, the feature amounts Sx of the cut group x including the subsequent cut are calculated as feature amounts of $x^{th}$ extraction images obtained by preferentially extracting the images near the final frame of the subsequent cut from images of the cut group x.

Meanwhile, when the degree of similarity of the feature amounts is smaller than the predetermined threshold value between the subsequent cut and all the cut groups 1 to m ("No" in step S41), the number m of the groups is incremented by 1 in order to generate a new cut group (step S47). A group ID corresponding to the number m of the groups is assigned to the subsequent cut as the new cut group (step S49). In such a case, the feature amounts Sm of the cut group m are generated and stored according to the following procedure (step S51).

First, a predetermined number of images are extracted from the images included in the subsequent cut as $m^{th}$ extraction images. The $m^{th}$ extraction images are also extracted according to the extraction rules illustrated in FIG. 7. Here, the $m^{th}$ extraction images are obtained by preferentially extracting images near the final frame of the subsequent cut from the images of the cut frame m.

Next, various feature amounts of the images extracted as the $m^{th}$ extraction images of the cut frame m are calculated. In addition, as the feature amounts of the first to $(m-1)^{th}$ extraction images of the cut groups 1 to m-1, feature amounts generated at the time of generation of each cut group are used.

Then, a "correct" tag is assigned to the $m^{th}$ extraction images and an "incorrect" tag is assigned to the first to $(m-1)^{th}$ extraction images. Here, the "correct" tag is assigned to the $m^{th}$ extraction images extracted from the cut group in because it is highly probable that the $m^{th}$ extraction images include the feature amounts Sm of the cut group m as compared with the first to $(m-1)^{th}$ extraction images, and the "incorrect" tag is assigned to the first to $(m-1)^{th}$ extraction images because it is less probable that the first to $(m-1)^{th}$ extraction images include the feature amounts Sm of the cut group m as compared with the $m^{th}$ extraction images.

Then, feature amounts corresponding to the $m^{th}$ extraction images having the "correct" tag assigned thereto and not corresponding to the first to $(m-1)^{th}$ extraction images having the "incorrect" tag assigned thereto are generated as the feature amounts Sm of the cut group m. That is, the feature amounts Sm of the cut group m are generated as feature amounts for distinguishing the $m^{th}$ extraction images from the first to $(m-1)^{th}$ extraction images. In this way, the feature amounts Sm of the cut group m are generated as the feature amounts of the $m^{th}$ extraction images obtained by preferentially extracting the images near the final frame of the subsequent cut from the images of the cut group m.

Returning to the description of FIG. 5, the processes of steps S37, S39, S41, S43, S45, S47, S49, and S51 are repeated until there is no subsequent cut. When there is no subsequent cut ("No" in step S37), the cut grouping process ends, and the process of the next step S17 is performed as illustrated in FIG. 3. The cut grouping processing unit 15 supplies the detection result of the cut transition and the cut grouping result to the cut structure image generation unit 17.

Figure 9:
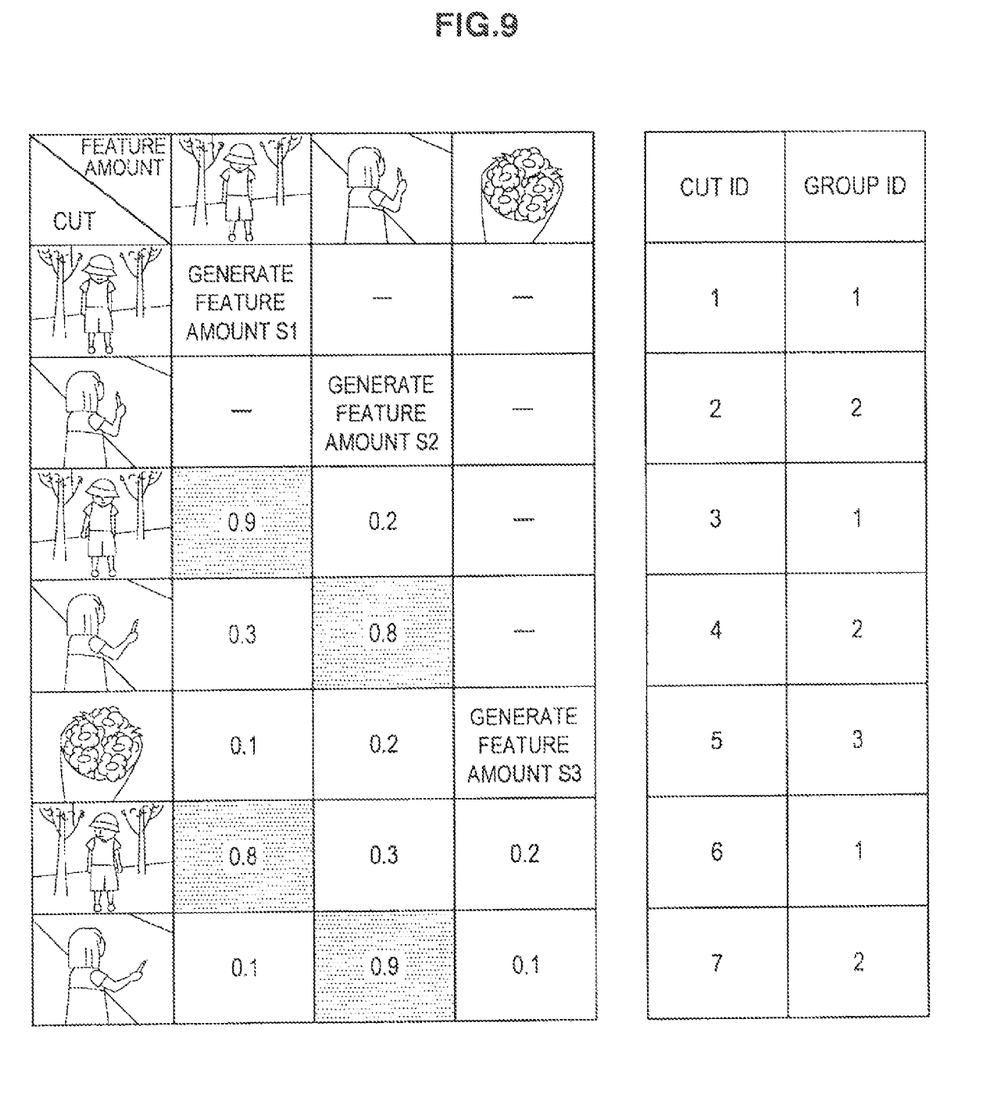
FIG. 9 is a diagram illustrating an example of the result of a cut grouping process.
Figure 10:
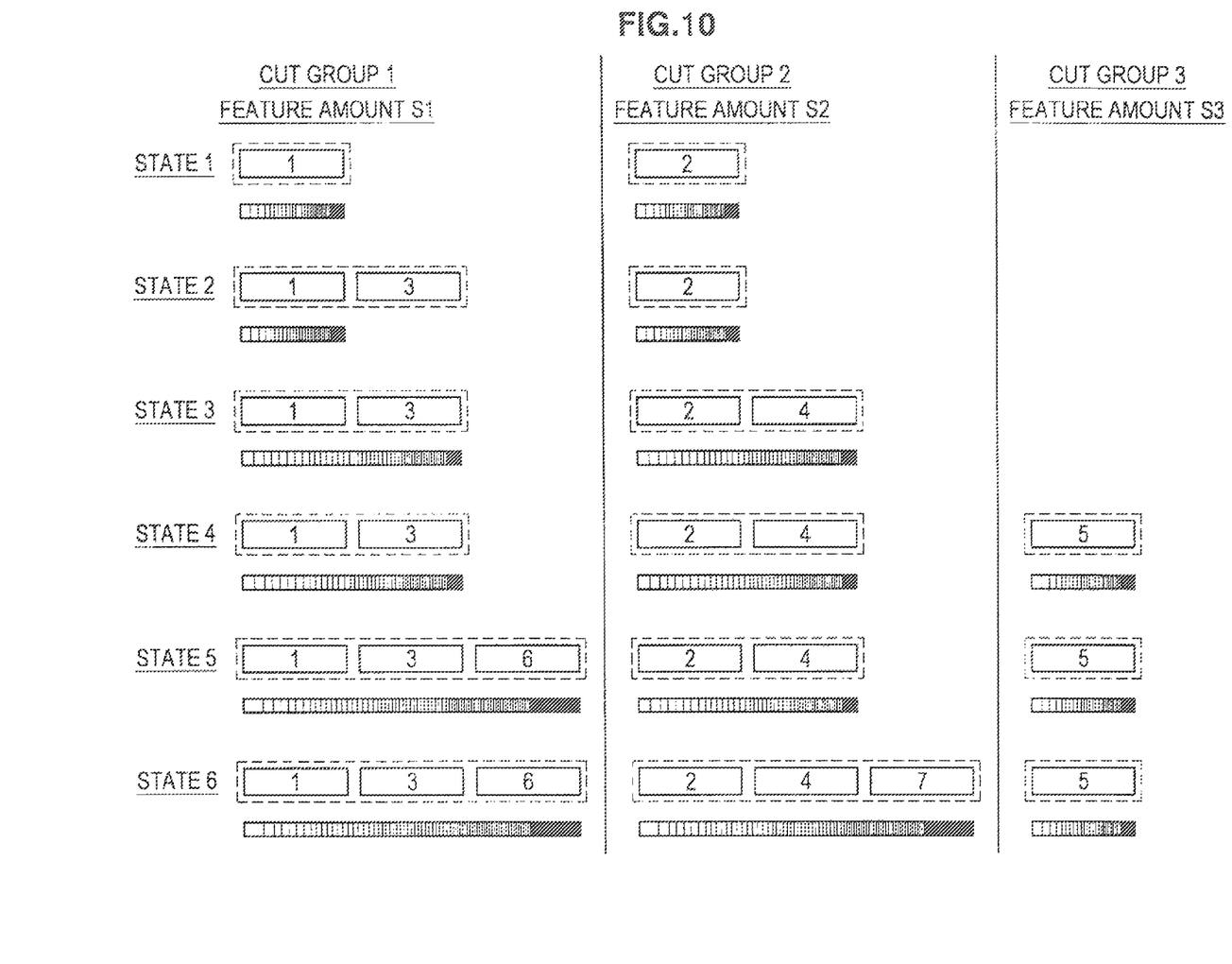
FIG. 10 is a diagram illustrating an example of the course of a feature amount generation process.

FIG. 9 illustrates an example of the result of the cut grouping process. FIG. 10 illustrates an example of the course of the feature amount generation process. FIGS. 9 and 10 illustrate the case in which the cut grouping process is performed with respect to the cut structure illustrated in FIG. 4. In addition, in FIG. 10, the positions of images preferentially extracted as the extraction images of a cut group are densely hatched.

First, as illustrated in FIG. 9, group IDs of 1 and 2 are assigned to the cuts 1 and 2, respectively. As illustrated in the state 1 of FIG. 10, the feature amounts S1 of the cut group 1 are generated as feature amounts of images obtained by preferentially extracting images near the final frame of the cut 1 from the images of the cut 1, and the feature amounts S2 of the cut group 2 are generated as feature amounts of images obtained by preferentially extracting images near the final frame of the cut 2 from the images of the cut 2.

Next, the similarity between the cut 3 and the cut groups 1 and 2 is determined. The similarity of the cut 3 is determined using feature amounts of images near the cut 3 based on the time codes of the moving image MP among the images of the cut groups 1 and 2, as illustrated in the state 1 of FIG. 10. In the example of FIG. 9, the cut 3 has the degrees 0.9 and 0.2 of similarity with respect to the cut groups 1 and 2, respectively. Thus, it is determined that the cut 3 is similar to the cut group 1 and is not similar to the cut group 2 (a threshold value for the determination of similarity is set to be equal to or more than similarity 0.5). For this reason, a group ID of 1 is assigned to the cut 3. As illustrated in the state 2 of FIG. 10, the feature amounts S1 of the cut group 1 are regenerated as feature amounts of images obtained by preferentially extracting images near the final frame of the cut 3 from the images of the cuts 1 and 3.

Then, the similarity between the cut 4 and the cut groups 1 and 2 is determined. The similarity of the cut 4 is determined using feature amounts of images near the cut 4 based on the time codes of the moving image MP among the images of the cut groups 1 and 2, as illustrated in the state 2 of FIG. 10. In the example of FIG. 9, the cut 4 has the degrees 0.3 and 0.8 of similarity with respect to the cut groups 1 and 2, respectively. Thus, it is determined that the cut 4 is similar to the cut group 2 and is not similar to the cut group 1. For this reason, a group ID of 2 is assigned to the cut 4. As illustrated in the state 3 of FIG. 10, the feature amounts S2 of the cut group 2 are regenerated as feature amounts of images obtained by preferentially extracting images near the final frame of the cut 4 from the images of the cuts 2 and 4.

Thereafter, the similarity between the cut 5 and the cut groups 1 and 2 is determined. The similarity of the cut 5 is determined using feature amounts of images near the cut 5 based on the time codes of the moving image MP among the images of the cut groups 1 and 2, as illustrated in the state 3 of FIG. 10. In the example of FIG. 9, the cut 5 has the degrees 0.1 and 0.2 of similarity with respect to the cut groups 1 and 2, respectively. Thus, it is determined that the cut 5 is not similar to either of the cut groups 1 and 2. For this reason, a cut group 3 is generated and a group ID of 3 is assigned to the cut 5. As illustrated in the state 4 of FIG. 10, the feature amounts S3 of the cut group 3 are generated as feature amounts of images obtained by preferentially extracting images near the final frame of the cut 5 from the images of the cut 5.

Next, the similarity between the cut 6 and the cut groups 1 to 3 is determined. The similarity of the cut 6 is determined using feature amounts of images near the cut 6 based on the time codes of the moving image MP among the images of the cut groups 1 to 3, as illustrated in the state 4 of FIG. 10. In the example of FIG. 9, the cut 6 has the degrees 0.8, 0.3 and 0.2 of similarity with respect to the cut groups 1 to 3, respectively. Thus, it is determined that cut 6 is similar to the cut, group 1 and is not similar to the cut groups 2 and 3. For this reason, a group ID of 1 is assigned to the cut 6. As illustrated in the state 5 of FIG. 10, the feature amounts S1 of the cut group 1 are regenerated as feature amounts of images obtained by preferentially extracting images near, the final frame of the cut 6 from the images of the cuts 1, 3 and 6.

Then, the similarity between the cut 7 and the cut groups 1 to 3 is determined. The similarity of the cut 7 is determined using feature amounts of images near the cut 7 based on the time codes of the moving image MP among the images of the cut, groups 1 and 2, as illustrated in the state 5 of FIG. 10. In the example of FIG. 9, the cut 7 has the degrees 0.1, 0.9 and 0.1 of similarity with respect to the cut groups 1 to 3, respectively. Thus, it is determined that the cut 7 is similar to the cut group 2 and is not similar to the cut groups 1 and 3. For this reason, a group ID of 2 is assigned to the cut 7. As illustrated in the state 6 of FIG. 10, the feature amounts S2 of the cut group 2 are regenerated as feature amounts of images obtained by preferentially extracting images near the final frame of the cut 7 from the images of the cuts 2, 4 and 7.

As a consequence, as illustrated in FIG. 9, for the cut structure illustrated in FIG. 4, the cuts 1, 3 and 6 are grouped into the cut group 1, the cuts 2, 4 and 7 are grouped into the cut group 2, and the cut 5 is grouped into the cut group 3.

Returning to the description of FIG. 3, when the cut grouping process ends, the cut structure image generation unit 17 first extracts the representative images 1 from a series of images included in each cut based on the moving image data MP and the detection result of the cut transition according to predetermined standards (step S17). In addition, the representative image I of each cut may be extracted in advance when the cut transition is detected. Next, the cut structure image CI is generated based on the specifying result of the cut groups (step S19). The cut structure image CI is generated as an image including the representative image I of each cut arranged in the order of the cut transition and indicating the cut groups.

Figure 11:
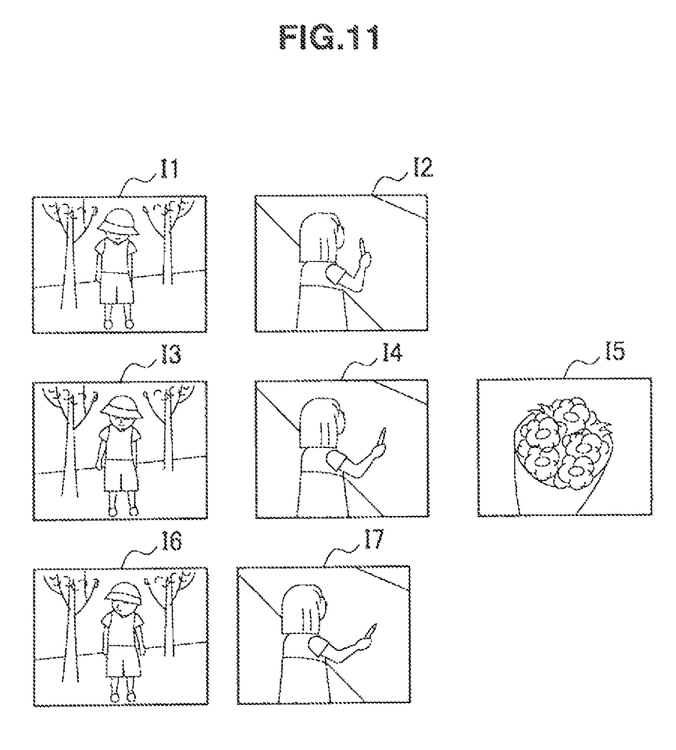
FIG. 11 is a diagram illustrating an example of a cut structure image.

FIG. 11 illustrates an example of the cut structure image CT generated from the specifying result of the cut groups illustrated in FIG. 9. In the cut structure image CI illustrated in FIG. 11, the representative images 11 and 12 of the cuts 1 and 2 are transversely arranged, the representative images 13 to 15 of the cuts 3 to 5 are transversely arranged below the representative images 11 and 12 of the cuts 1 and 2, and the representative images 16 and 17 of the cuts 6 and 7 are transversely arranged below the representative images 13 and 14 of the cuts 3 and 4. Using the cut structure image CI as described above, the cut structure is easily understood. In addition, the structure of the cut structure image CI is not limited to the structure illustrated in FIG. 11.

4. CONCLUSION

As described above, in accordance with the moving image processing apparatus 1 and the moving image processing method according to the embodiment of the present disclosure, the feature amounts S of each cut group are generated by emphasizing the feature amounts of images near the subsequent cuts, which are to be subject to determination of similarity, among the images included in each cut group based on the time codes of the moving image MP. Consequently, it is possible to appropriately group the subsequent cuts by sufficiently considering the temporal context (a story and the like of the moving image MP) between cuts.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-179696 filed in the Japan Patent Office on Aug. 10, 2010, the entire content of which is hereby incorporated by reference.

What is claimed is:

1. A moving image processing apparatus comprising:
   a similarity determination unit configured to determine a degree of similarity between a subsequent cut in a moving image and first and second cut groups based on feature amounts generated from extraction images of the first cut group included in the moving image and feature amounts generated from extraction images of the second cut group included in the moving image;
   a cut grouping unit configured to group the subsequent cut into one of the first and second cut groups when the subsequent cut is similar to the first or second cut group, and group the subsequent cut into a third cut group when the subsequent cut is not similar to either of the first or second cut groups;
   a feature amount generation unit configured to compare extraction images extracted from the third cut group with the extraction images extracted from the first and second cut groups when the subsequent cut is not similar to either of the first or second cut groups, and generate feature amounts of the third cut group, wherein the feature amount generation unit compares extraction images extracted from the first cut group with extraction images extracted from the second cut group, and generates feature amounts of the first cut group and feature amounts of the second cut group; and an image extraction unit configured to preferentially extract an image with a later time code of the moving image from images included in each cut group.

2. The moving image processing apparatus according to 1, wherein, when the subsequent cut is similar to the first or second cut group, the feature amount generation unit compares extraction images extracted from the similar cut group including the subsequent cut with extraction images extracted from a cut group not similar to the subsequent cut, and generate feature amounts of the similar cut group.

3. The moving image processing apparatus according to claim 2, wherein, when the subsequent cut is similar to the first or second cut group, the image extraction unit extracts the extraction images from the subsequent cut and the cut group similar to the subsequent cut.

4. The moving image processing apparatus according to claim 2, wherein, when the subsequent cut is similar to the first or second cut group, the image extraction unit extracts the extraction images from the subsequent cut.

5. The moving image processing apparatus according to claim 1, wherein the image extraction unit extracts images positioned at a regular interval in order from the latest time code, from the images included in each cut group.

6. The moving image processing apparatus according to claim 1, wherein the image extraction unit extracts images positioned at an interval expressed by geometric progression in order from the latest time code from the images included in each cut group.

7. The moving image processing apparatus according to claim 1, wherein the image extraction unit extracts images positioned at an interval expressed by progression of differences in order from the latest time code from the images included in each cut group.

8. A moving image processing method comprising:
determining a degree of similarity between a subsequent cut in a moving image and first and second cut groups based on feature amounts generated from extraction images of the first cut group included in the moving image and feature amounts generated from extraction images of the second cut group included in the moving image;
when the subsequent cut is similar to the first or second cut group, grouping the subsequent cut into one of the first and second cut groups; and
when the subsequent cut is not similar to either of the first or second cut groups, grouping the subsequent cut into a third cut group, and
comparing extraction images extracted from the third cut group with the extraction images extracted from the first and second cut groups to generate feature amounts of the third cut group, wherein the extraction images of each cut group are obtained by extracting an image with a later time code in the moving image from images included in each cut group.

9. The moving image processing method according to claim 8, further comprising comparing extraction images extracted from the similar cut group including the subsequent cut with extraction images extracted from a cut group not similar to the subsequent cut, when the subsequent cut is similar to the first or second cut group, and generating feature amounts of the similar cut group.

10. The moving image processing method according to claim 9, further comprising extracting the extraction images from the subsequent cut and the cut group similar to the subsequent cut when the subsequent cut is similar to the first or second cut group.

11. The moving image processing method according to claim 9, further comprising extracting the extraction images from the subsequent cut when the subsequent cut is similar to the first or second cut group.

12. The moving image processing method according to claim 8, further comprising comparing extraction images extracted from the first cut group with extraction images extracted from the second cut group, and generating feature amounts of the first cut group and feature amounts of the second cut group.

13. The moving image processing method according to claim 8, further comprising extracting images positioned at a regular interval in order from the latest time code, from the images included in each cut group.

14. The moving image processing method according to claim 8, further comprising extracting images positioned at an interval expressed by geometric progression in order from the latest time code from the images included in each cut group.

15. The moving image processing method according to claim 8, further comprising extracting images positioned at an interval expressed by progression of differences in order from the latest time code from the images included in each cut group.

16. A non-transitory computer-readable storage medium having stored thereon, a computer program having at least one code section, the at least one code section being executable by one or more processors for causing a computer to perform steps comprising:
determining a degree of similarity between a subsequent cut in a moving image and first and second cut groups based on feature amounts generated from extraction images of the first cut group included in the moving image and including a first cut and feature amounts generated from extraction images of the second cut group included in the moving image and including a second cut;
when the subsequent cut is similar to the first or second cut group, grouping the subsequent cut into one of the first and second cut groups; and
when the subsequent cut is not similar to either of the first or second cut groups, grouping the subsequent cut into a third cut group, and
comparing extraction images extracted from the third cut group with the extraction images extracted from the first and second cut groups to generate feature amounts of the third cut group, wherein extraction images of each cut group are obtained by extracting an image with a later time code in the moving image from images included in each cut group.

17. A moving image processing apparatus comprising:
a similarity determination unit configured to determine a degree of similarity between a subsequent cut in a moving image and first and second cut groups based on feature amounts generated from extraction images of the first cut group included in the moving image and feature amounts generated from extraction images of the second cut group included in the moving image;
a cut grouping unit configured to group the subsequent cut into one of the first and second cut groups when the subsequent cut is similar to the first or second cut group, and group the subsequent cut into a third cut group when the subsequent cut is not similar to either of the first or second cut groups;

a feature amount generation unit configured to compare extraction images extracted from the third cut group with the extraction images extracted from the first and second cut groups when the subsequent cut is not similar to either of the first or second cut groups, and generate feature amounts of the third cut group, wherein, when the subsequent cut is similar to the first or second cut group, the feature amount generation unit compares extraction images extracted from the similar cut group including the subsequent cut with extraction images extracted from a cut group not similar to the subsequent cut, and generate feature amounts of the similar cut group; and an image extraction unit configured to preferentially extract an image with a later time code of the moving image from images included in each cut group, thereby obtaining extraction images of each cut group.

18. A moving image processing apparatus comprising:

a similarity determination unit configured to determine a degree of similarity between a subsequent cut in a moving image and first and second cut groups based on feature amounts generated from extraction images of the first cut group included in the moving image and feature amounts generated from extraction images of the second cut group included in the moving image;

a cut grouping unit configured to group the subsequent cut into one of the first and second cut groups when the subsequent cut is similar to the first or second cut group, and group the subsequent cut into a third cut group when the subsequent cut is not similar to either of the first or second cut groups;

a feature amount generation unit configured to compare extraction images extracted from the third cut group with the extraction images extracted from the first and second cut groups when the subsequent cut is not similar to either of the first and second cut groups, and generate feature amounts of the third cut group; and an image extraction unit configured to preferentially extract an image with a later time code of the moving image from images included in each cut group, thereby obtaining extraction images of each cut group, wherein the image extraction unit extracts images positioned at a regular interval in order from a latest time code, from the images included in each of the cut groups.

19. A moving image processing apparatus comprising:

a similarity determination unit configured to determine a degree of similarity between a subsequent cut in a moving image and first and second cut groups based on feature amounts generated from extraction images of the first cut group included in the moving image and feature amounts generated from extraction images of the second cut group included in the moving image;

a cut grouping unit configured to group the subsequent cut into one of the first and second cut groups when the subsequent cut is similar to the first or second cut group, and group the subsequent cut into a third cut group when the subsequent cut is not similar to either of the first or second cut groups;

a feature amount generation unit configured to compare extraction images extracted from the third cut group with the extraction images extracted from the first and second cut groups when the subsequent cut is not similar to either of the first or second cut groups, and generate feature amounts of the third cut group; and an image extraction unit configured to preferentially extract an image with a later time code of the moving image from images included in each cut group, thereby obtaining extraction images of each cut group, wherein the image extraction unit extracts images positioned at an interval expressed by geometric progression in order from a latest time code from the images included in each of the cut groups.

20. A moving image processing apparatus comprising:

a similarity determination unit configured to determine a degree of similarity between a subsequent cut in a moving image and first and second cut groups based on feature amounts generated from extraction images of the first cut group included in the moving image and feature amounts generated from extraction images of the second cut group included in the moving image;

a cut grouping unit configured to group the subsequent cut into one of the first and second cut groups when the subsequent cut is similar to the first or second cut group, and group the subsequent cut into a third cut group when the subsequent cut is not similar to either of the first or second cut groups;

a feature amount generation unit configured to compare extraction images extracted from the third cut group with the extraction images extracted from the first and second cut groups when the subsequent cut is not similar to either of the first or second cut groups, and generate feature amounts of the third cut group; and an image extraction unit configured to preferentially extract an image with a later time code of the moving image from images included in each cut group, thereby obtaining extraction images of each cut group, wherein the image extraction unit extracts images positioned at an interval expressed by progression of differences in order from a latest time code from the images included in each of the cut groups.

* * * * *